US007766038B2

(12) United States Patent
Geddes et al.

(10) Patent No.: US 7,766,038 B2
(45) Date of Patent: Aug. 3, 2010

(54) MANIFOLD FOR MULTI-JET POOL FIXTURE

(75) Inventors: Brent Geddes, Riverton, UT (US); Scott A. Wilson, Salt Lake City, UT (US)

(73) Assignee: Venturi Jet Sets, Inc., Riverton, UT (US)

(*) Notice: Subject to any disclaimer, the term of this patent is extended or adjusted under 35 U.S.C. 154(b) by 64 days.

(21) Appl. No.: 12/072,140

(22) Filed: Feb. 21, 2008

(65) Prior Publication Data

US 2008/0209627 A1 Sep. 4, 2008

Related U.S. Application Data

(60) Provisional application No. 60/891,017, filed on Feb. 21, 2007.

(51) Int. Cl.
*F16L 41/00* (2006.01)
*A61H 33/02* (2006.01)
*A61H 33/06* (2006.01)

(52) U.S. Cl. .................... 137/561 A; 137/883; 4/541.5; 4/541.4

(58) Field of Classification Search ............. 137/561 A, 137/561 R, 883; 4/541.1, 541.4, 541.5
See application file for complete search history.

(56) References Cited

U.S. PATENT DOCUMENTS 1,855,258 A * 4/1932 Sirch ............................. 4/507
5,279,003 A * 1/1994 Gape et al. ................... 4/541.6
5,334,352 A 8/1994 Johnson
5,372,160 A * 12/1994 Ward ...................... 137/561 A
D360,017 S 7/1995 Lopez
5,474,102 A 12/1995 Lopez
5,754,989 A 5/1998 Ludlow
D394,898 S * 6/1998 Evans ........................ D23/214
5,878,964 A 3/1999 Hansen
5,987,663 A 11/1999 Ludlow et al.
6,000,073 A 12/1999 Eddington
6,092,246 A 7/2000 Ludlow
6,256,805 B1 7/2001 Ludlow et al.
D465,012 S 10/2002 Tauzer
6,543,067 B2 4/2003 Eddington et al.
6,622,947 B1 9/2003 Rivera
D488,543 S 4/2004 Fulcher et al.

OTHER PUBLICATIONS http://SpaPartsNet.Com/Jets/Waterway-Jets, Spapartsnet.com, 2 pages, Dec. 26, 2006.
http://SpaPartsNet.Com/cgi-bin/cg/index.cgi?s=5a &c=d934fa63fbdff...., SpaPartsNet.Com, 3 pages, Dec. 26, 2006.

* cited by examiner

*Primary Examiner*—John Rivell
*Assistant Examiner*—Atif H Chaudry
(74) *Attorney, Agent, or Firm*—Thorpe North & Western LLP

(57) ABSTRACT

A manifold device for a multi-jet pool fixture includes a central chamber having a jet interface surface. An inlet in fluid communication with the central chamber allows fluid to flow into the central chamber and out a plurality of openings disposed in the jet interface surface. An outlet in fluid communication with the central chamber allows water to flow out of the central chamber.

19 Claims, 7 Drawing Sheets

MANIFOLD FOR MULTI-JET POOL FIXTURE

PRIORITY CLAIM

Benefit is claimed of U.S. Provisional Patent Application No. 60/891,017, filed Feb. 21, 2007, which is herein incorporated by reference in its entirety for all purposes.

BACKGROUND OF THE INVENTION

Hot tubs, spas, swimming pools, water fountains, and the like often have pressure jets that shoot jets of water into a water basin or pool area. Such pressure jets are often clustered for therapeutic purposes, such as in a hot tub, or aesthetic purposes, such as in a water fountain. When clustered for therapeutic purposes, as in a hot tub or spa, the pressure jets are often positioned in close proximity to one another so as to shoot massaging jets of water against the major muscle groups of a person sitting in the hot tub.

It will be appreciated that plumbing these closely spaced pressure jet clusters has been challenging since multiple elbows, nozzles, pipes, reducers, unions, and the like must be joined together in a relatively small and confined space. The use of plastic or polymeric basins in hot tubs and spas has facilitated fabrication of these tightly packed, therapeutic pressure jet clusters because flexible plastic piping can be used to reduce or eliminate elbows, reducers, unions and the like. Unfortunately, this type of piping can be easily damaged and has not been practical for use in hot tubs and pools having liners made from an aggregate material such as gunite, shotcrete, plaster, cement, or the like.

Hot tubs, spas, pools, and the like with basins made from such aggregate materials are often more durable than basins made from polymer materials. However, these types of basins often permanently fix the plumbing of the tub or pool and surround the plumbing with the aggregate material. Consequently, the flexible piping used with polymeric basins can be crushed or damaged by the aggregate material. For this reason, more traditional rigid piping continues to be used for these aggregate basins which makes fabrication of a tightly packed jet cluster difficult and time consuming, if not entirely impossible due to space constraints.

SUMMARY OF THE INVENTION

The invention provides a manifold device to provide a multi-jet pool fixture including a central chamber having a jet interface surface. The manifold device also includes an inlet in fluid communication with the central chamber configured to allow fluid to flow into the central chamber, and an outlet in fluid communication with the central chamber configured to allow fluid to flow out of the central chamber. A plurality of openings disposed in the jet interface surface can receive water from the central chamber and direct the flow of the water away from the central chamber.

Additional features and advantages of the invention will be apparent from the detailed description which follows, taken in conjunction with the accompanying drawings, which together illustrate, by way of example, features of the invention.

DETAILED DESCRIPTION

Figure 1:
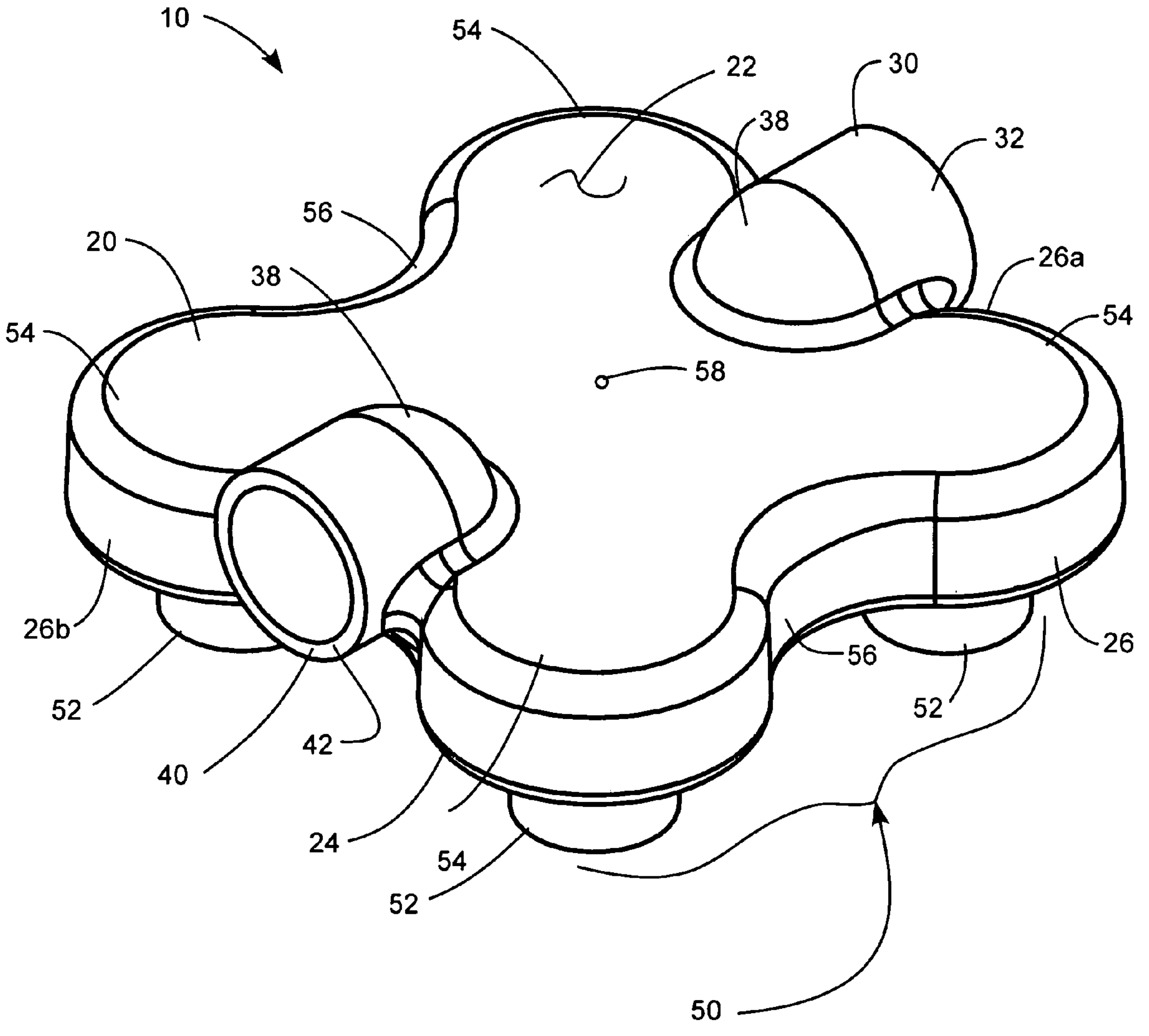
FIG. 1 is a perspective view of a manifold device in accordance with an embodiment of the present invention.
Figure 2:
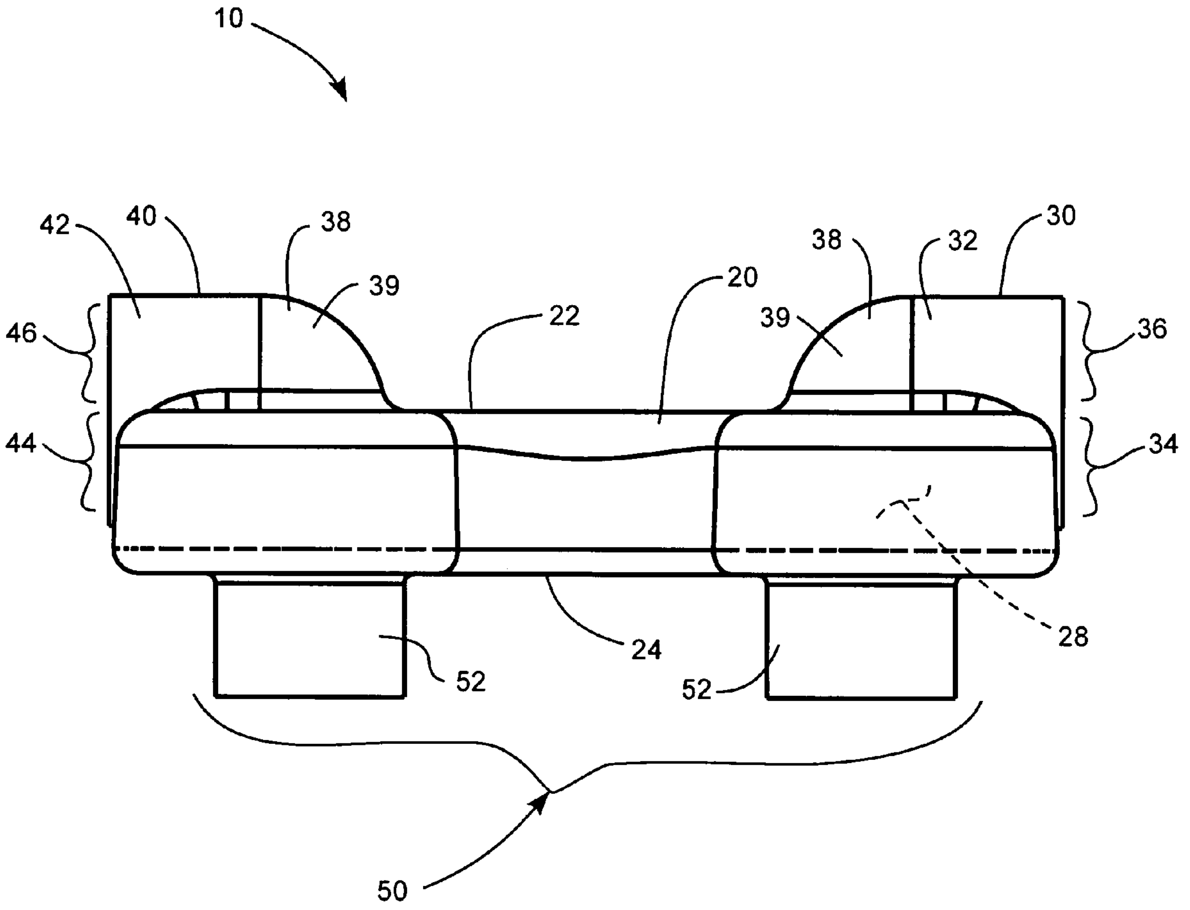
FIG. 2 is a side view of the manifold device of FIG. 1.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The embodiments of the present invention described herein generally provide a manifold device for a multi-jet pool fixture or pressure jet cluster for a hot tub, swimming pool, water fountain, or the like. The manifold device as described in this disclosure can have a central chamber with an inlet and outlet in fluid communication with the central chamber. The central chamber can also have a plurality of openings to direct water from the chamber to a plurality of pressure jets. The openings can be located on one side or face of the central chamber so that the openings are coplanar and maintain relatively constant pressure for each of the openings. The manifold device can also be shaped to facilitate flow of an aggregate hardening material around the manifold device during installation so that the device can be anchored to an aggregate basin or pool liner.

As illustrated in FIGS. 1-5, a manifold device, indicated generally at 10, in accordance with an embodiment of the present invention is shown for use in providing a hot tub, swimming pool, spa, water fountain or the like with a multi-jet pool fixture, or pressure jet cluster. The manifold device 10 can have a central chamber indicated generally at 20, an inlet 30, an outlet 40, and a plurality of openings indicated generally at 50.

The central chamber 20 can have a back surface 22 and an opposing jet interface surface 24. The back surface 22 and the jet interface surface 24 can be substantially planar surfaces. Additionally, the jet interface surface 24 can be oriented substantially parallel to the back surface 22. The back surface 22 and jet interface surface 24 can be separated by a space, indicated at 28 in FIG. 2.

Side walls 26 can be disposed between the back surface 22 and the jet interface surface 24 to create the space 28 between the back surface and the jet interface surface. In this way, the central chamber 20 can be formed between the back surface 22 and the opposing jet interface surface 24 with the side walls 26 forming a perimeter around the central chamber 20. Fasteners 8, such as screws, bolts, rivets, and the like can secure the back surface 22 to the jet interface surface 24 and the sidewalls 26.

The inlet 30 may be disposed in one of the side walls **26*a*. In one embodiment, the inlet 30 can be substantially circular and can have a tubular flange 32 extending away from the central chamber 20. The inlet 30 can have a diameter or width, W. The inlet 30 can also have a greater cross section than the cross section of the opposing sidewalls 26 such that a portion 34 (FIG. 2) of the inlet flows directly into the central chamber 20 and a portion 36** of the inlet is diverted into the central chamber.

A reducer 38 or elbow can reduce the greater cross sectional area of the inlet to match the cross sectional area of the central chamber. The reducer 38 can also divert the portion 36 of the inlet into the central chamber 20. For example, the reducer 38 can include a 90 degree elbow 39 that can direct a portion of the flow into the central chamber 20.

Figure 3:
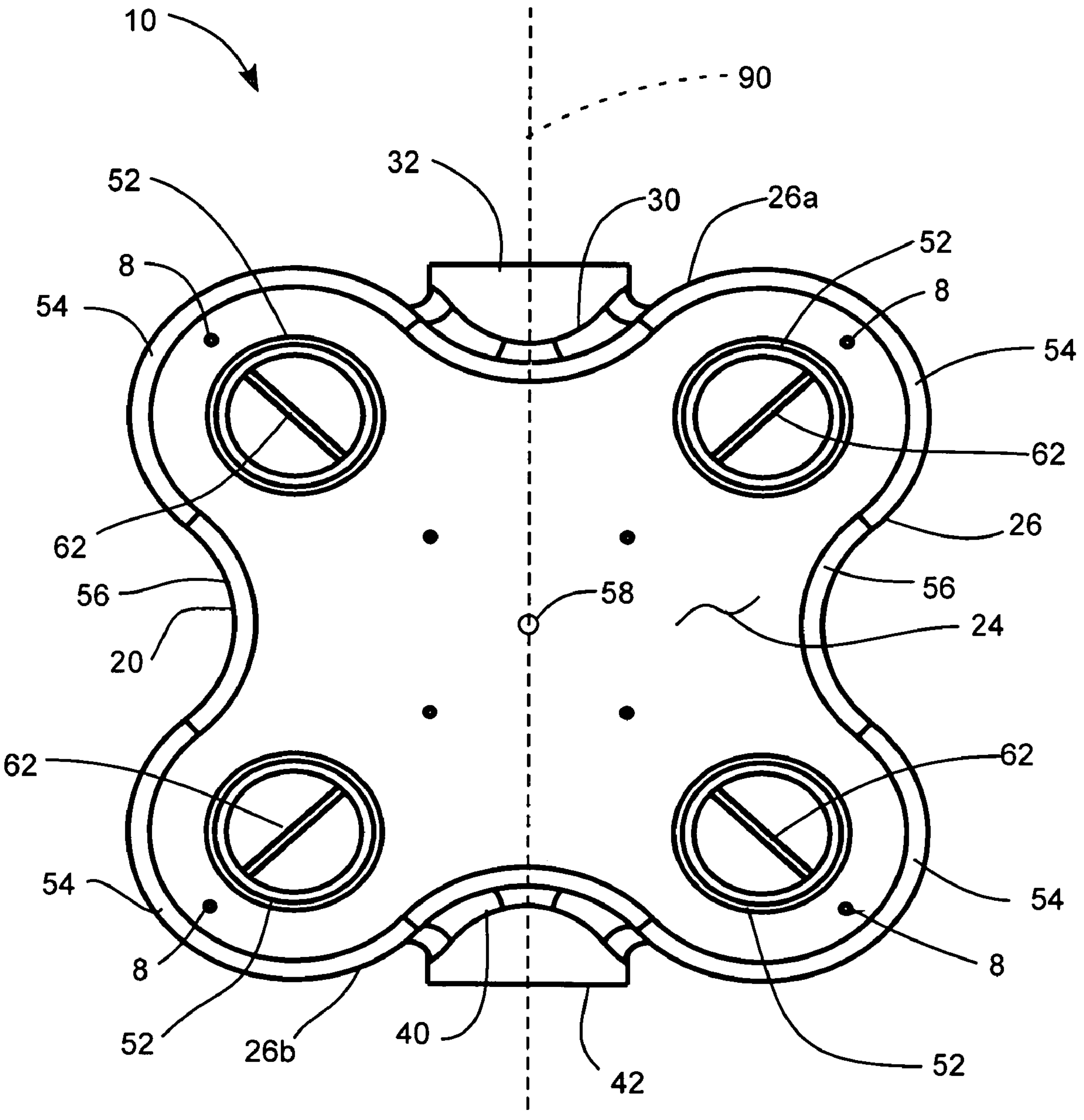
FIG. 3 is top view of the view of the manifold device of FIG. 1.
Figure 4:
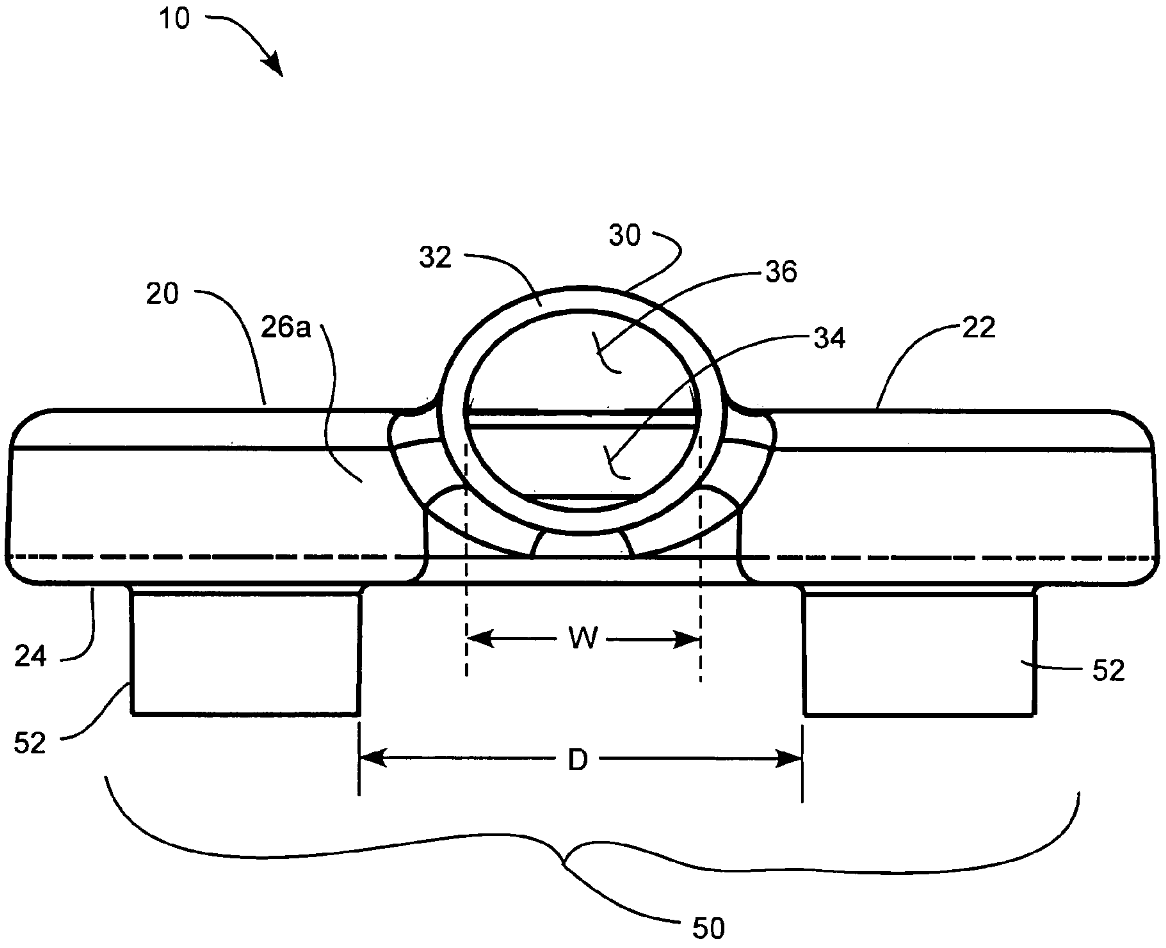
FIG. 4 is a side view of the manifold device of FIG. 1.
Figure 5:
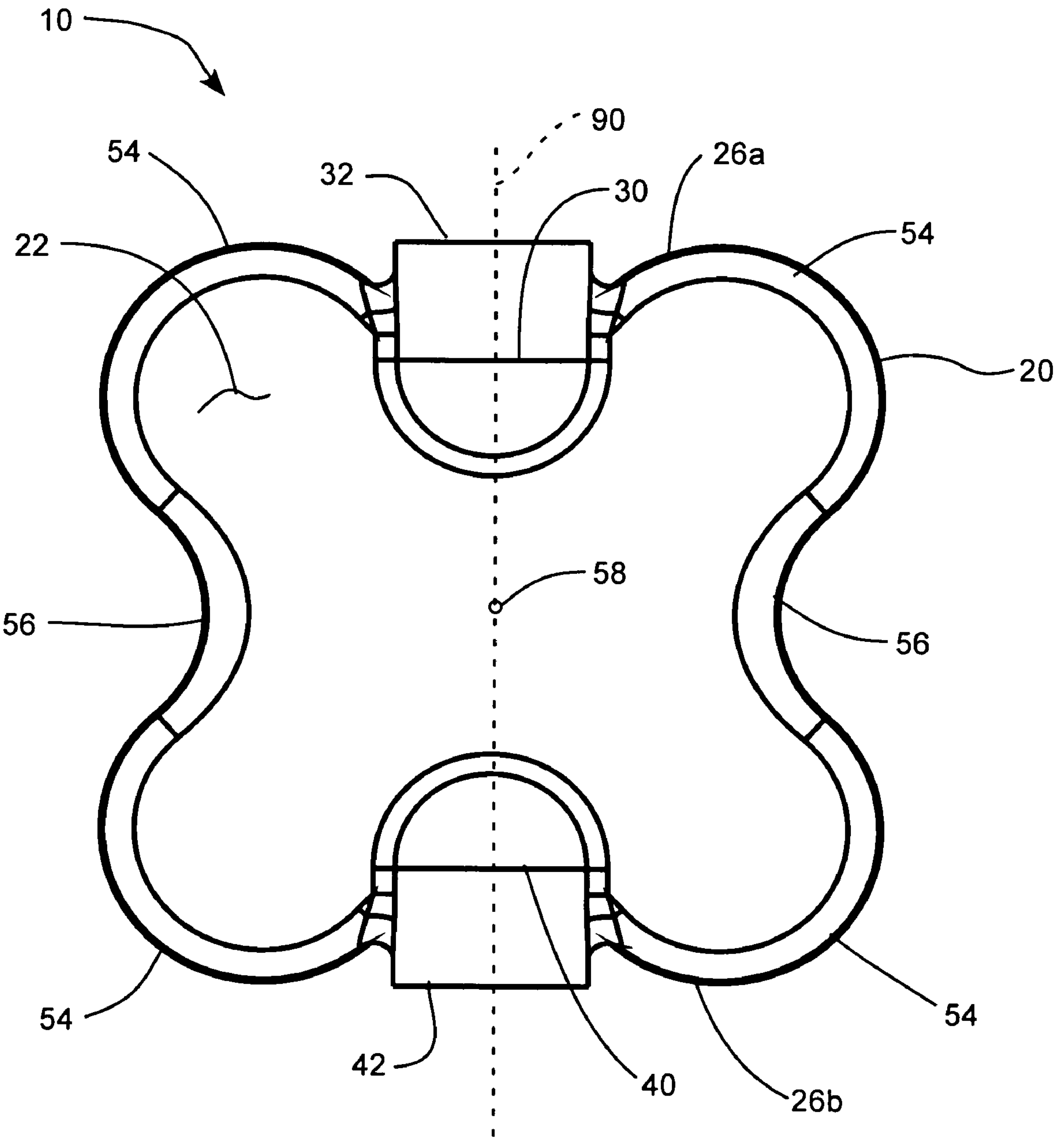
FIG. 5 is a bottom view of the manifold device of FIG. 1.

The outlet 40 can be disposed in another of the side walls 26. For example, the outlet 40 can be disposed in the side wall 26*b* directly opposite the inlet 30. In this way, the inlet 30 and outlet 40 may be positioned to be substantially in line with one another. Thus, in one embodiment the inlet 30 and the outlet 40 can be positioned along a substantially common longitudinal axis, indicated by dashed line 90, as shown in FIGS. 3 and 5. It will be appreciated, however, that the inlet 30 and outlet 40 may also be in a non-aligned orientation.

Additionally, the outlet 40 can be substantially circular and can have a tubular flange 42 extending away from the central chamber 20. In one embodiment, the outlet 40 can have a greater cross section than the cross section of the opposing sidewalls 26.

The inlet 30 and outlet 40 can also have other sizes and shapes in relation the cross section of the central chamber 20 in order to achieve a desired flow configuration. For example, in another embodiment (not shown) the cross section of the inlet and/or outlet can be substantially equal to the cross section of the central chamber so as to reduce protrusion of the inlet and outlet flanges away from the central chamber. In this way, the manifold could have a slimmer profile and be more conveniently used in confined space applications. Additionally, the inlet and outlet can be polygonal, quadrangular, triangular, or square tubes.

Additionally, the outlet 40 of a first manifold 10 can be coupled to the inlet 30 of a second manifold 10. In this way a chain of manifolds 10 coupled in series can be formed around the tub or pool and clusters of jets can be strategically positioned in the tub or pool liner. Additionally, the number of manifolds used and the positioning of the manifolds with respect to one another in the pool can facilitate balancing the water pressure throughout the hot tub or pool.

Turning to FIGS. 1-4, the plurality of openings 50 can be disposed in the jet interface surface 24. Each of the openings 50 can be substantially circular and can have a tubular flange 52 extending away from the jet interface surface 24. In one embodiment, each of the openings 50 can be oriented such that the direction of flow through the plurality of openings is substantially perpendicular to the direction of flow between the inlet 30 and outlet 40.

The openings 50 can be spaced apart from one another by a predetermined distance, D. The distance D can be larger than the width of the inlet W. In use, water can flow from the inlet and into the central chamber before exiting out one of the plurality of openings. In this way, the water pressure can be substantially equalized between each of the openings.

Additionally, the central chamber 20 can have a top cross sectional shape that can facilitate flow through the chamber 20 and placement along a basin or pool liner. For example, the top cross sectional shape of the central chamber 20 can be a circle, a triangle, a quadrangle, a polygon, an oval, a cloverleaf, a diamond, or a lobed polygon. The shape of the central chamber 20 can determine the placement of each of the plurality of openings 50.

Thus, as best seen in FIGS. 1, 3, and 5, the central chamber 20 can have a top cross sectional shape of a lobed polygon with a lobe 54 forming each corner of the polygon and an indentation 56 between each lobe 54. Each lobe 54 can extend away from a center point 58 of the central chamber 20 in a clover leaf pattern. Additionally, each lobe 54 can be sized and shaped to carry one of the plurality of openings 50 in the front jet interface surface 24.

Each indentation 56 can be sized and shaped to facilitate flow of an aggregate hardening material around the manifold device 10. For example, the indentations 56 can be positioned closer to the center point 58 of the central chamber 20 than each lobe 54, and can provide a pathway for unhardened aggregate material to flow around the manifold 10 in order to surround or enclose the manifold in aggregate material. In this way, the manifold 10 can be rigidly fixed in place in relation to the basin or liner of the hot tub, spa, pool or the like.

It will be appreciated that the lobed shape of the manifold 10 shown and described herein can be placed in a tub or pool liner in a variety of orientations. For example, the manifold 10 can be placed with a top row of openings positioned above a bottom row of openings. Additionally, the manifold 10 can be placed so as to orient the openings in a diamond or three tier shape with a single opening on top, a row of two openings below the top opening, and a single lower opening. Other orientations of the manifold 10 can also be contemplated such as tilting the manifold forward or rearward in order to direct the angle of the jet streams of water emanating from the nozzles.

Figure 6:
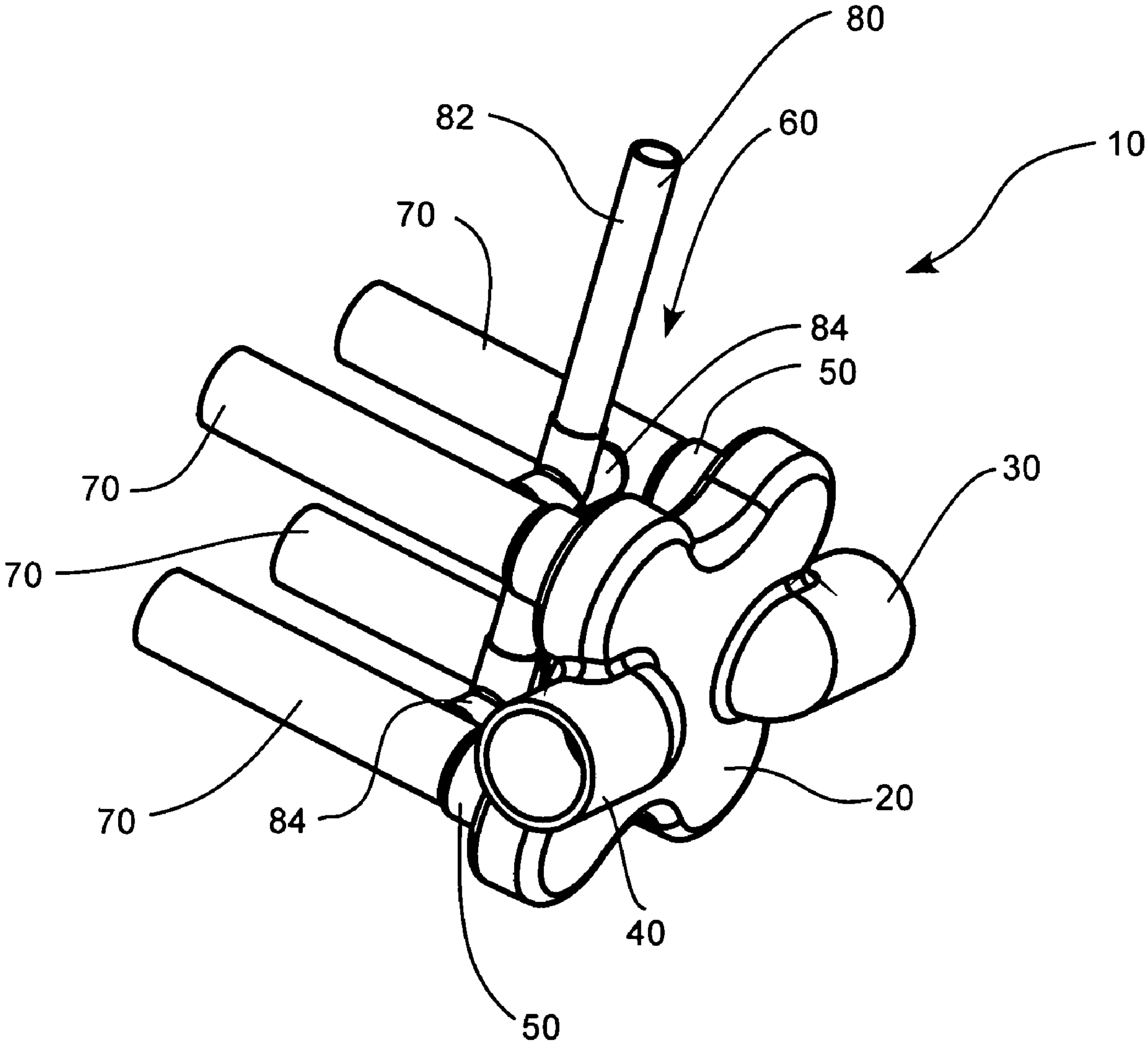
FIG. 6 is a perspective view of the manifold device of FIG. 1 shown coupled to plurality of pressure jets and an air intake.

Turning to FIG. 6, the manifold device 10 can be coupled to a plurality of pressure jet nozzles, indicated generally at 60. Specifically, each of the openings 50 can be coupled to a different pressure jet 62, so that water can flow through the opening and into the pressure jet. The pressure jets can be venturi type jets, or other types of pressurizing nozzles, as known in the art.

Additionally tubes 70 can extend from the pressure jet nozzles 60 to the outlets 50 in order to direct flow from the pressure jets to a hot tub or pool. An air intake 80 can also be coupled to the tubes 70 and can be in fluid communication with the tubes to supply air into the fluid stream emanating from the plurality of jet nozzles 60. In one embodiment, the air intake 80 can include a venturi tube 82 coupled to the venturi nozzles 60 such that as water is pumped through the venturi nozzles 60 suction is created in the venturi tubes 82, thereby drawing air through the tubes and into the water jet stream emanating from the venturi nozzles.

Thus, the manifold device 10 and plurality of pressure jets 60 can supply an aerated and pressurized stream of water to the hot tub or pool. In one embodiment, a separate air intake 80 can be associated with every manifold 10 in a chain of manifolds such that each manifold in a tub or pool can be individually adjusted to provide a desired amount of aeration in the water stream from the jet nozzles. In another embodiment, each manifold 10 in a chain of manifolds can be coupled to a single air intake 80 with a cross connector (not shown) that can interconnect the air tubes 84 to each of the pressure jets 60.

It will be appreciated that the air intake 80 may also extend laterally away from the manifold before extending upward. Thus, the air intake 80 can be plumbed to any desired location for convenient access to the tub or pool user.

The manifold device 10 and pressure jets 50 can form a configurable pressure jet cluster that can be positioned into an aggregate lined pool hot tub or pool for therapeutic or aesthetic purposes. Advantageously, the embodiments of the manifold 10 of the present invention disclosed herein can be prefabricated and placed into the pool or tub form or liner prior to application of the aggregate liner material and can have sufficient structure to withstand the fabrication stresses and pressures applied during application of the aggregate liner. Additionally, the manifold 10 can be made of suitable materials to withstand the caustic chemicals commonly found in uncured aggregate liner materials such as gunite, shotcrete, plaster, and the like.

In use, water can flow into the central chamber 20 through the inlet 30 and can fill the central chamber. Water can then flow from the central chamber out the plurality of openings 50 and into the pressure jets 60. The pressure jets can accelerate the stream of water flowing from the outlets and shoot the water into the hot tub or pool. A valve (not shown) on the air intake 80 can be opened to allow bubbles to provide a more forceful therapeutic stream of water, or closed to form a more soothing steady flow of water into the tub or pool. With the central chamber 20 filled with water and water flowing out the plurality of openings 50, water can also flow out the outlet 40 and toward additional manifold devices in the hot tub or pool.

Additionally, the embodiments of the invention shown provide valuable results because the manifold device 10 can reduce the space and time necessary for individually plumbing each pressure jet. In one example, use of the manifold described herein significantly decreased the installation time of a hot tub. In addition, it can be difficult to separately plumb multiple jets so that they can be used in close proximity to each other and the present embodiment helps overcome such limitations.

The described embodiments of the invention are also able to avoid breaking the tile line of a pool or making significant incursions in the pool cement that is located in or near the water line. The embodiments allow multiple jets to be included into a hot tub, spa or pool system without any unsightly additions or distracting changes to the pool's water line or interior gunite, or tile surface.

Figure 7:
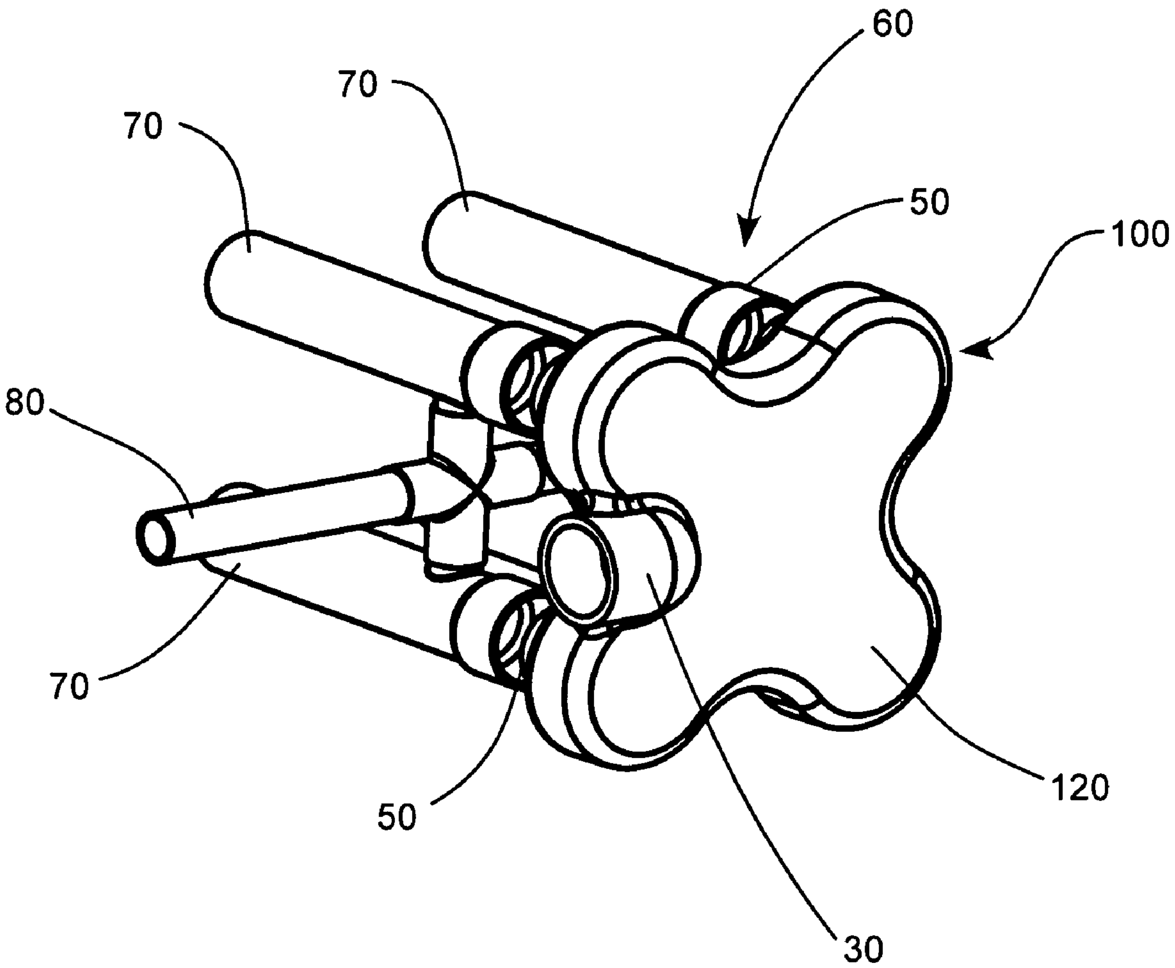
FIG. 7 is a perspective view of a manifold device in accordance with another embodiment of the present invention, shown coupled to plurality of pressure jets and an air intake.

As illustrated in FIG. 7, a manifold device 100 is shown in accordance with another embodiment of the present invention for use for use in providing a hot tub, swimming pool, water fountain or the like with a multi-jet pool fixture, or pressure jet cluster. The manifold 100 can be similar in many respects to the manifold device 10 described above and shown in FIGS. 1-6. The manifold device 100 can have a central chamber 120 and inlet 30 and a plurality of openings in a jet interface surface 24. Advantageously, the manifold device 100 may have no outlet that is connectable to adjoining manifolds so as to be useful as an end piece in the chain of manifolds described above. Additionally, the manifold 100 may be used as the only manifold in a hot tub or pool.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A manifold device to provide a multi-jet pool fixture, comprising:

a central chamber formed by a back surface and a front jet interface surface, and a plurality of side walls disposed between the back surface and the jet interface surface, wherein the central chamber has a lobed cross sectional shape with an indentation between each lobe, each indentation being positioned closer to a center point of the central chamber than each lobe;

an inlet disposed in one of the plurality of side walls configured to direct water into the central chamber; and a plurality of openings disposed in the jet interface surface with each of the openings oriented such that the direction of flow through the plurality of outlets is substantially perpendicular to the direction of flow from the inlet.

2. The manifold device of claim 1, wherein the inlet has a width and the plurality of openings are spaced apart from one another on the jet interface surface by a distance greater than the width of the inlet.

3. The manifold device of claim 1, wherein the back surface and the jet interface surface are substantially planar with each other and the central chamber is formed between the back surface and the opposing jet interface surface.

4. The manifold device of claim 1, further comprising an outlet disposed in different side wall than the side wall with the inlet.

5. The manifold device of claim 4, wherein the outlet is disposed in an opposite side wall from the sidewall with the inlet, and positioned to be inline with the position of the inlet along the opposite side walls.

6. The manifold device of claim 4, wherein the inlet has a greater cross section than a cross section of the sidewalls and further includes a reducer to reduce the cross section of the inlet and to divert a portion of flow from the inlet into the central chamber.

7. The manifold device of claim 1, wherein the reducer includes a 90 degree elbow.

8. The manifold device of claim 1, wherein the central chamber has a top cross sectional shape selected from the group consisting of a circle, a triangle, a quadrangle, a polygonal, an oval, a cloverleaf, a diamond, a lobed polygon, and combinations thereof.

9. The manifold device of claim 1, wherein each lobe carries an opening in the front jet interface surface.

10. The manifold device of claim 1, wherein each indentation is sized and shaped to facilitate flow of an aggregate hardening material around the manifold device.

11. The manifold device of claim 1, further comprising a plurality of jet nozzles associated with the plurality of openings, each opening in fluid communication with one of the plurality of jet nozzles.

12. The manifold device of claim 11, wherein the jet nozzles are venturi nozzles.

13. The manifold device of claim 11, further comprising an air intake in fluid communication with each of the plurality of jet nozzles to introduce air into a fluid stream emanating from the plurality of jet nozzles.

14. A manifold device to provide a multi-jet pool fixture, comprising:

a central chamber having a jet interface surface an a cross sectional shape of a lobed polygon with a lobe forming each corner of the polygon;

an indentation disposed between each lobe, each indentation being positioned closer to a center point of the central chamber than each lobe;

an inlet in fluid communication with the central chamber configured to allow fluid to flow into the central chamber;

an outlet in fluid communication with the central chamber configured to allow fluid to flow out of the central chamber; and a plurality of openings disposed in the jet interface surface with each opening disposed in a different lobe of the central chamber, and configured to receive water from the central chamber and direct the flow of the water away from the central chamber.

15. The manifold device of claim 14, wherein each indentation is sized and shaped to facilitate flow of an aggregate hardening material around the manifold device such that the aggregate hardening material is allowed to surround the manifold device.

16. The manifold device of claim 14, wherein the central chamber further includes a back surface substantially planar and spaced apart from the jet interface surface, and the central chamber is formed between the back surface and the opposing jet interface surface.

17. The manifold device of claim 16, wherein the inlet has a width and the plurality of openings are spaced apart from one another on the jet interface surface wider than the width of the inlet.

18. A manifold device to provide a multi-jet pool fixture, comprising:

a central chamber formed by a back surface and a front jet interface surface, and a plurality of side walls disposed between the back surface and the jet interface surface, wherein the central chamber has a lobed cross sectional shape with an indentation between each lobe each indentation being positioned closer to a center point of the central chamber than each lobe;

an inlet disposed in one of the plurality of side walls and having a width, the inlet being configured to direct water into the central chamber;

an outlet disposed in different side wall than the side wall with the inlet, and configured to receive and direct water away from the central chamber; and a plurality of openings disposed in the jet interface surface with each of the openings spaced apart from one another on the jet interface surface wider than the width of the inlet, and oriented such that the direction of flow through the plurality of openings is substantially perpendicular to the direction of flow from the inlet, wherein each lobe carries an opening in the front jet interface surface.

19. The manifold device of claim 18, wherein the inlet has a greater cross section than a cross section of the sidewalls and further includes a reducer to reduce the cross section of the inlet and to divert the flow from the inlet such that a portion of flow from the inlet is diverted into the central chamber.

* * * * *